United States Patent [19]

Parsons

[11] 4,257,267

[45] Mar. 24, 1981

[54] DISPENSER UNIT WITH LOCKABLE ACTUATING LEVER

[75] Inventor: Frederick L. Parsons, Ridgewood, N.J.

[73] Assignee: Bohr Scientific Corporation, Morristown, N.J.

[21] Appl. No.: 952,559

[22] Filed: Oct. 18, 1978

[51] Int. Cl.³ .................... G01N 1/14

[52] U.S. Cl. .................... 73/425.6; 222/309; 222/391

[58] Field of Search .................... 222/391, 309; 73/425.4 P, 425.6; 128/218 D, 218 PA, 219, 220, 218 R

[56] References Cited

U.S. PATENT DOCUMENTS

| | | | |
|---|---|---|---|
| 2,305,238 | 12/1942 | Coates | 222/391 X |
| 2,685,389 | 8/1954 | Robbens | 222/391 X |
| 2,916,057 | 12/1959 | Carle et al. | 222/309 X |
| 3,810,391 | 5/1974 | Suovaniemi | 222/309 X |

*Primary Examiner*—Stanley H. Tollberg
*Attorney, Agent, or Firm*—Martin L. Faigus

[57] ABSTRACT

A dispenser unit preferably adjustable for either single dose or multiple dose dispensing of fluids; primarily for the precision dispensing of small volumes (e.g. volumes measured in microliters). The unit includes an elongate actuator rod axially moveable in one direction to dispense the fluid, and a hand-engageable dispensing lever including a passageway through which the actuator rod extends. A measured, or predetermined quantity of the fluid is dispensed by manually applying a force to the lever in the one axial direction to maintain a canted relationship between the lever and actuator rod. This canted relationship causes surfaces of the passageway to lock against the actuator rod, and the axially directed manual force on the lever will move the rod to dispense the fluid. Most preferably a separate securing mechanism also is provided to cause the lever and actuator rod to lock together so that they will move as a single unit in either axial direction when it is desired to convert the unit from a multiple dose dispenser to a single dose dispenser. Most preferably the dispensing lever extends through an elongate slot in a side wall of a body section of the unit, and this slot is interrupted by upper and lower surfaces that define the length of the dispensing stroke of the lever. Most preferably the upper and lower surfaces interrupting the slot are axially adjustable to vary the length of the dispensing stroke.

25 Claims, 8 Drawing Figures

DISPENSER UNIT WITH LOCKABLE ACTUATING LEVER

TECHNICAL FIELD

This invention relates generally to a dispenser unit, and more specifically to a dispenser unit for the precision dispensing of fluids; preferably in either single or multiple dose portions.

Reference to "single dose" dispensing, as employed throughout this application, means that the exact quantity of fluid either drawn into or retained within the dispenser unit is dispensed as a single dosage. These single dose dispenser units for use in the medical and scientific field are referred to as "pipetters".

Reference to "multiple dose" dispensing, as employed throughout this application, means that several individual doses of a fluid are dispensed from a larger volume storage chamber of the device. This storage chamber can be a prefilled vial containing the fluid to be dispensed; or alternatively, it can be a chamber or reservoir into which the fluid to be dispensed is drawn; preferably by an actuating mechanism forming part of the dispenser unit. These multiple dose dispenser units for use in the medical and scientific field are referred to as "dispensers".

BACKGROUND ART

Single dose dispenser units (pipetters) and multiple dose dispenser units (dispeners) are well known devices employed in the medical and scientific field. Both of these devices generally are employed for metering, or dispensing small volumes of liquid (i.e. microlitres) in a controlled manner in various testing and sampling procedures. In some procedures it is necessary to dispense single doses of various different fluids into different vials or containers. For this purpose single dose pipetters most desirably can be employed. In other applications it is necessary to inject small measured quantities of the same fluid into various different containers. For these applications multiple dose dispensers are generally employed. It has been most common for medical and scientific testing facilities to stock different devices for single and multiple dose dispensing, respectively.

In single dose dispensers (e.g. pipetters) it is most desirable to provide for easy removal of the tip, or pipette, into which the single dose of fluid to be dispensed is initially drawn. This is particulary important when various different fluids are to be sampled or tested, to thereby avoid contamination of one fluid with another. Accordingly it is highly desirable to provide an extremely simple and reliable mechanism for ejecting or removing the tip from the unit; preferably without the necessity of physically handling or touching the tip.

In multiple dose dispensers the barrel or vial in which the fluid to be dispensed is retained should be easily removable from the unit for subsequent replacement. In dispensing devices employing actuator rods extending into the barrel it is often necessary to withdraw the rod from the barrel before the barrel can be removed. When a piston head is connected to the rod it is sometimes necessary to separate the head from the rod in order to permit the rod to be withdrawn.

In both single and multiple dose dispensers it is highly desirable to provide for the adjustability of the volume of fluid to be dispensed. This should be achievable in a simple and reliable manner.

The following patents are considered to be material to the examination of this application, and are made of record herein pursuant to the requirements of 37 CFR 1.56.

Caulking guns and similar devices generally include actuating mechanisms for the multiple dose dispensing of a compound from a storage chamber or compartment. Although these devices are not at all concerned with the precision, small volume (i.e. microlitre) dispensing of fluids in the medical or scientific fields they do disclose actuating mechanisms employing an elongate rod that is relatively moveable through an opening in an actuating plate, and that is adapted to be moved in increments by the actuating plate to dispense material in multiple doses. Representative patents relating to this type of device are: U.S. Pat. Nos. 2,530,359 (Peterson); 2,602,570 (Sherbondy); 2,602,571 (Sherbondy); 2,732,102 (Ekins); 2,786,604 (Collins); 3,381,861 (Stein) and 3,997,085 (Lindquist).

In distinction to single and multiple dose dispensers employed in the medical field, the actuating mechanisms, or plates employed in the devices disclosed in the above patents are not directly engagable by the hand of the user; but rather are actuated through a trigger or other similar device to provide a mechanical advantage. Although in Peterson the lever 30 is adapted to be engaged by hand at 31, it is for the sole purpose of releasing the retaining force on the actuator rod so that the rod can be withdrawn. In other words the hand actuation of the lever 30 does not move the actuator rod to dispense a fluid from the unit. Moreover none of the above devices are designed to precisely vary the volume of a fluid to be dispensed.

Medical syringes and similar devices for varying the stroke of a dispensing plunger to vary the quantity of a fluid to be dispensed have been disclosed in the patent literature. Representative devices of this type are disclosed in U.S. Pat. Nos. 2,156,023 (McKay); 2,916,057 (Carle et al.); 3,815,790 (Allen et al.); 3,831,602 (Broadwin) and 3,831,603 (Armenti).

The McKay patent discloses a device in which adjustment of the dispensing stroke is achieved by moving concentric actuator rods 12 and 13 relative to each other. After the desired stroke has been set the concentric rods are caused to move together as a single unit by tightening the finger-operated handle 17 onto the split end of the rod 13 by tightening the bolt or stud 18. Unless and until the stud 18 is tightened the handle 17 will not be functional to dispense any fluid from the device.

In the Allen et al. device different end caps (e.g. 7) are employed to vary the length of the plunger stroke.

In the Carle et al. device a collar is moved along a plunger rod to provide an adjustable stop that limits the distance the rod can be withdrawn for taking fluid samples.

In the Broadwin device the stroke of a plunger 32 is varied by changing the effective length of a longitudinal slot 62 in a tubular support member 42. This stop functions to limit the stroke of a pusher 48 by engaging a projection 64 formed as an integral part of the pusher. Although this device employs a means for varying the stroke of the pusher rod it is not adjustable to provide both single dose and multiple dose dispensing The Armenti patent employs measuring shelves 24 that can be adjustably mounted on its associated plunger. In this manner the position of the shelves can be varied to vary the length of plunger travel.

It is also known in the dispensing art to provide micrometer calibrations to set and indicate the volume of fluid to be dispensed from syringes, pipetters and similar dispensers. Devices of this type are represented in U.S. Pat. Nos. 2,250,467 (Cole); 2,283,915 (Cole); 3,232,117 (Gilmont); 3,334,788 (Hamilton) and 3,815,785 (Gilmont). Although these patents disclose various different arrangements of micrometer calibrations employed to set the quantity of a fluid to be dispensed; none of these patents disclose a system in which the micrometer calibrations are employed to either indicate or set the length of a dispensing slot through which a finger-engageable dispensing lever is adapted to move to provide the dispensing operation. As will be explained hereinafter, it is this latter type of arrangement that is employed in applicant's device.

It is also known in the prior art to provide syringes which can be set for either single dose or multiple dose dispensing; as represented by the disclosures in U.S. Pat. Nos. 2,457,859 (Austin) and 4,050,459 (Sanchez). Both of these devices require the formation of abutments or stops in the surface of a piston rod, and this represents a somewhat complex approach to achieving both single and multiple dose dispensing with a single unit. In fact, to the best of applicant's knowledge devices of the type disclosed in the Austin and Sanchez patents are not being commercially utilized.

DISCLOSURE OF THE INVENTION

This invention relates to a dispenser unit that preferably can be adjusted, or set for either single dose or multiple dose dispensing; primarily for the precision dispensing of small volumes of fluid for medical and scientific testing and sampling procedures. Moreover the dispenser unit includes a very simple and reliable adjustment system for varying, or changing the quantity of fluid to be dispensed in either single or multiple doses. Also, a simple and reliable arrangement is provided for ejecting dispensing tips, or pipettes that can be employed as part of the unit. When the dispenser unit is employed for the multiple dose dispensing of a fluid, a volume of the fluid is retained in a barrel or vial that can be removed from the unit.

A dispenser unit, preferably for the precision dispensing of a fluid, includes an elongate actuator rod axially moveable in one direction to dispense the fluid; a hand-engagable dispensing lever extending laterally of the actuator rod and including a passageway through which the rod extends, said actuator rod and lever being axially moveable relative to each other when the lever is disposed generally normal to the axis of said actuator rod, said passageway being provided with a surface that locks against the rod when the lever is canted out of said generally normal position, said lever being engagable by hand for maintaining the lever canted and locked to said actuator rod while moving said rod in the one axial direction to dispense the fluid; and a body section through which the actuator rod axially extends, said body section including an elongate slot through which the hand-engagable section of the dispensing lever extends, said elongate slot being interrupted by upper and lower surfaces that are axially spaced from each other to define the length of the dispensing stroke.

In the most preferred embodiment of this invention the dispenser unit is convertible from a multiple dose dispenser to a single dose dispenser. In order to accomplish this conversion a separate securing mechanism is provided to cause the lever and actuator rod to lock together so that they will move as a single unit in both axial directions. Most preferably the securing mechanism is in the form of a bolt or screw passing through an opening in the lever and into an offset region of the passageway through which the actuator rod extends to thereby engage the actuator rod and cause the lever to cant into locking engagement with said rod.

In a preferred embodiment of this invention a dispensing tip includes an outer peripheral surface that frictionally engages the inner surface of an intermediate barrel member that in turn is connected to the body of the dispenser unit. The actuator rod, or a piston head connected to the lower end of said rod, is adapted to be operated to press downwardly against the upper surface of the tip for releasing its frictional engagement with the inner surface of the barrel, without the necessity of physically handling the tip. This permits easy and reliable replacement of tips; a feature that is particularly desirable in single dose pipetting operations wherein different fluids are to be sampled or employed in a testing procedure. Unless the tips are replaced when a new fluid is to be dispensed, contamination of the new fluid can occur.

In accordance with a preferred aspect of this invention the body of the dispenser unit includes inner and outer housings moveable axially relative to each other. The upper surface interrupting the elongate slot in a surface moveable with one of the housing members, and the lower surface interrupting the slot is moveable with the other housing member. By adjusting the axial position of the two housings relative to each other the spacing between the upper and lower surfaces interrupting the slot can be adjusted to vary the length of the dispensing stroke, and thereby vary the volume of fluid to be dispensed. Most preferably calibrations are associated with axially moveable sections of the unit to provide a indicator system for precisely setting the volume of fluid that is to be dispensed from, or drawn into the unit.

When the unit is employed as a multiple dose dispenser, the fluid to be dispensed in successive dosages is stored or retained in the barrel of the device. This barrel can either be a prefilled vial, or alternatively, the fluid to be dispensed can be sucked into it from a desired canister or container. In either case the actuator rod will extend into the barrel, and this rod can include a piston head closely conforming to inner surfaces of the barrel to provide the required fluid tight seal either to suck fluid into the barrel, or to dispense fluid from said barrel. In the preferred embodiment of this invention the barrel is removably mounted to the main body of the unit; but is connected in a manner that will not permit its removal by hand with an in-line, or axial pulling force. Specifically, the connection is made so that removal is achieved by bending the barrel relative to the body in a manner similar to that employed to break a twig. However, in order to achieve separation in this manner it is necessary for the actuator rod to be moved out of closely conforming relationship with inner surfaces of the barrel. Otherwise the rod could be bent or broken by the removal operation.

In accordance with a preferred aspect of this invention the inner housing of the body includes a lower surface that is adapted to engage the piston head and separate it from the actuator rod when said rod is pulled outwardly to force the head against said lower surface. The separated piston head will be retained in the barrel, and the rod can then be withdrawn into the inner housing to permit separation of the barrel from the body of the unit.

It is an object of this invention to provide a dispenser unit for the precision dispensing of small volume doses of fluids.

It is a further object of this invention to provide a simple and reliable dispenser unit that can be adjusted for either single or multiple dose dispensing of a fluid.

It is a further object of this invention to provide a dispenser unit that can be adjusted for either single dose or multiple dose precision dispensing of fluids; preferably in small volume doses (e.g. microlitres).

It is a further object of this invention to provide a dispenser unit permitting adjustment of the volume of the dosage to be dispensed.

It is a further object of this invention to provide a dispenser unit that can be adjusted for either single or multiple dose dispensing, wherein the volume of liquid to be dispensed as either a single or multiple dose can be varied.

It is a further object of this invention to provide a dispenser unit employing a dispensing tip for receiving a fluid to be dispensed, and for easily separating the tip from the unit for replacement with a different tip.

It is a further object of this invention to provide a dispenser unit having a removable barrel sectin in which a fluid to be dispensed can be stored.

It is a further object of this invention to provide a dispenser unit of the type having a piston head connected to the lower end of an actuator rod and closely conforming to inner surfaces of a barrel section, wherein simple and reliable means are provided to separate the piston head from the rod to permit removal of the rod from the barrel section so that the barrel section can then be removed from the main body of the unit.

Other objects and advantages of this invention will be apparent by referring to the detailed description which follows, taken in conjunction with the drawings.

DESCRIPTION OF THE BEST MODE OF THE INVENTION

Figure 1:
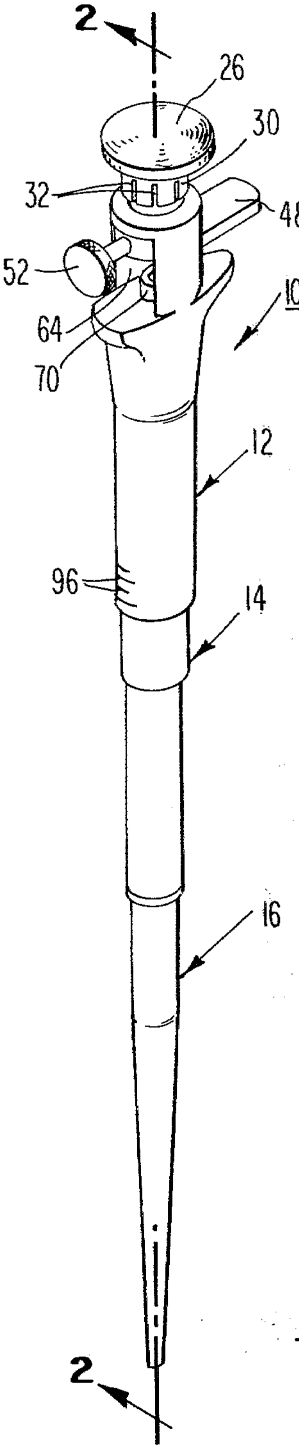
FIG. 1 is an isometric view of the dispenser unit of this invention.

Although specific terms are used in the following description for the sake of clarity, these terms are intended to refer to the particular structure of the invention selected for illustration in the drawings and are not intended to define or limit the scope of the invention.

Referring to FIG. 1, a dispenser unit 10 that can be adjusted for either single dose or multiple dose dispensing is shown. The arrangement of elements initially will be described in connection with the use of the unit 10 in the precision, multiple dose dispensing of a fluid.

Figure 2:
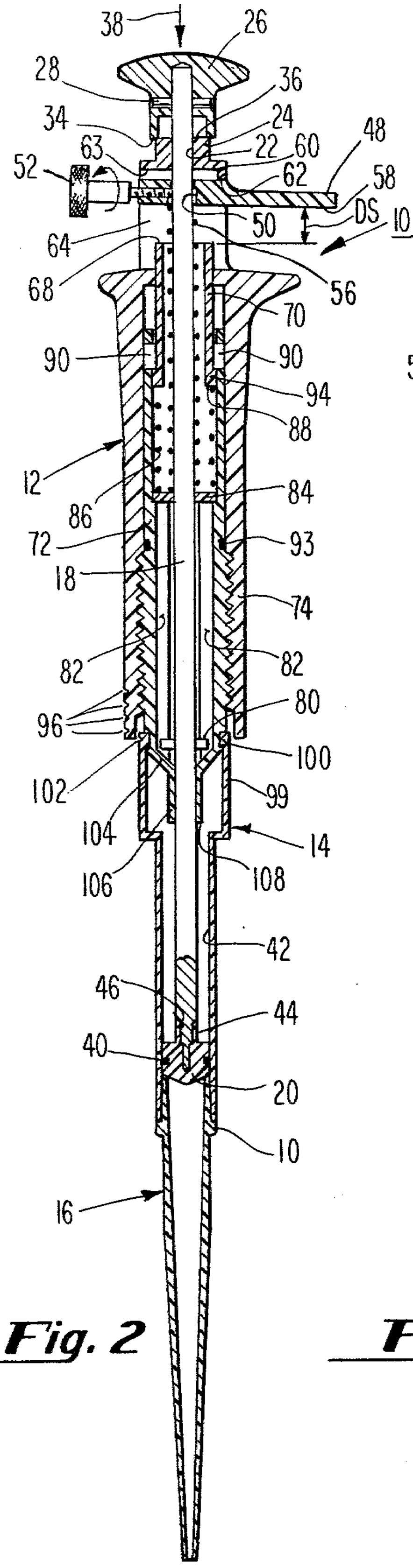
FIG. 2 is a sectional view taken along line 2—2 of FIG. 1, and showing the condition of the dispenser unit prior to receiving a fluid to be dispensed.
Figure 3:
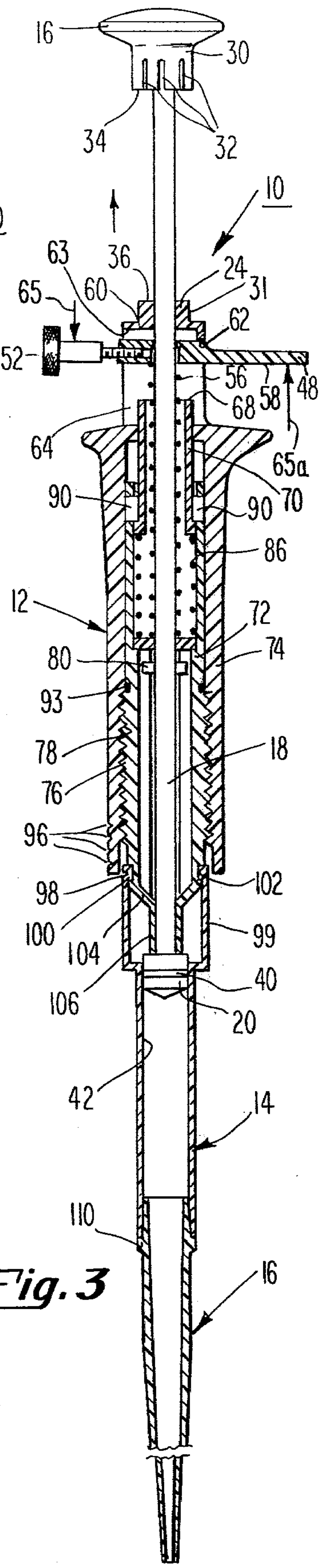
FIG. 3 is a view similar to FIG. 2, but showing the condition of the dispenser unit after it has been actuated to draw a fluid into it.

As can be seen best in FIGS. 1–3, the dispenser unit 10 include a main body section 12, a barrel 14 and a tip, or pipette 16. The main body section includes the actuating mechanism employed for both single and multiple dose dispensing, and the barrel 14 is employed to receive, or retain a quantity of liquid to be dispensed in multiple doses. The tip 16 can take on various different shapes and configurations, and generally will be the only element into which liquid will be drawn when the dispenser unit is being employed as a single dose dispenser, or pipetter.

FIGS. 1 and 2 show the position of elements of the dispenser unit 10 prior to being actuated to draw a fluid into it for subsequent dispensing. In this condition an actuator rod 18 includes a piston head 20 at its lower end and the head 20 is positioned adjacent the upper end of the tip 16. The upper end of the actuator rod extends through an opening 22 in a top wall of an annular hub 24 of the main body section 12, and a hand-engagable knob 26 is pinned to the actuator rod through a roll pin 28, or similar retention device. In this manner the knob 28 is fixed against rotation relative to the actuator rod 18.

Referring to FIGS. 1 and 3, the knob 26 includes a downwardly extending annular skirt 30 having a series of weakened regions or recesses 32 formed therein. These recesses permit the skirt 30 to flex, or expand outwardly to be forced over and around the side walls 31 of the hub 24 when a downward force is applied directly to the knob 26 in the direction indicated by arrow 38 in FIG. 2. The system is designed so that a fairly high force must be applied directly to the knob to force the skirt over the hub, and unless this force is applied to the knob, the lower surface 34 of the skirt will engage the upper surface 36 of the hub 24, in the position illustrated in FIG. 2.

Referring specifically to FIGS. 2 and 3, the piston head 20 is provided with an O-ring 40 to establish a fluid-tight seal with the inner surface 42 of the barrel 14. The piston head 20 further includes an upwardly directed skirt 44 having an inturned annular rib 46 that releasably engages a corresponding recess in the lower end of the actuator rod 18 (FIG. 2). The reason for this releasable connection between the piston head 20 and the actuator rod 18 will be explained later.

A hand-or finger-engagable dispensing lever 48 is employed to dispense fluid from the dispenser unit 10. This lever includes a passageway 50 having a surface that closely embraces the actuator rod 18. When the lever is generally normal to the axis of the actuator rod 18, and the securing screw or bolt 52 is backed out of engagement with said rod, the rod and lever can be moved axially relative to each other. However, when the lver is canted relative to the rod they will be locked together to move as a single unit. Preferably the pasageway 50 is counter-bored to include an offset lower section having a surface spaced from the rod 18 for a purpose that will be explained later in connection with converting the unit from a multiple dose dispenser to a single dose dispenser. FIG. 2 shows the manner in which the securing screw 52 is rotated to back it out of engagement with the actuator rod 18. In addition, FIG. 2 shows the manner in which a compression spring 56 engages the bottom surface 58 of the lever 48 to bias said lever into a position wherein its upper surface 60 engages at least the front upper wall section 62 of a slot through which said lever extends. The front upper wall section 62 of the slot is lower than a rear upper wall section 63, and this results in the spring 56 biasing the lever 48 into a canted position relative to the actuator rod 18 (FIG. 2). This will lock the lever to the rod, and thereby prevent inadvertent movement of the rod relative to said lever.

To suck liquid into the barrel 14 the securing means 52 is first backed out of engagement with the actuator rod 18, if necessary, in the manner illustrated in FIG. 1. Thereafter, the lever 48 is tilted into a generally normal position relative to the actuator rod 18, by either manually pushing down on the securing screw 52, as indicated by arrow 65, or manually pushing up on the opposite end of the lever, as indicated by arrow 65*a* (FIG. 3). Thereafter the actuator rod can be pulled outwardly through the passageway 50 in the lever 48, as illustrated in FIG. 3, to suck liquid into the barrel 14. The liquid will be sucked through the tip 16 and into the barrel 14 for subsequent dispensing in a plurality of small dosages (e.g. microlitre dosages).

Figure 4:
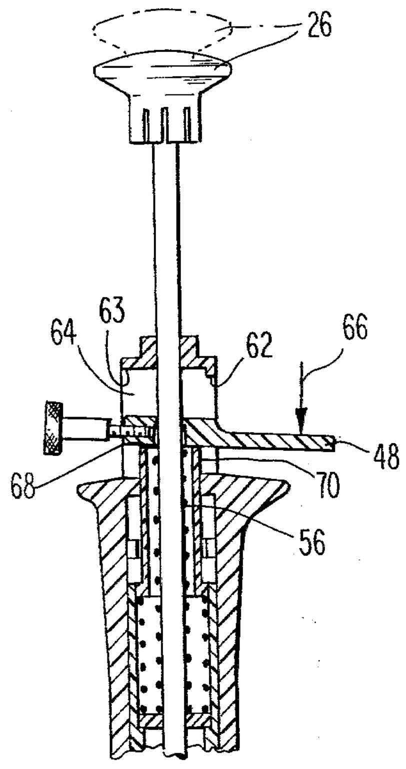
FIG. 4 is a fragmentary view of the top portion of the unit shown in FIG. 3, and indicating in solid representation the position of the elements after the unit has been operated to dispense a portion of the fluid previously drawn into it.

Referring to FIG. 4 a small dose of the liquid from the barrel 14 is dispensed by manually pushing downwardly on the lever 48, as indicated by arrow 66, to maintain the canted relationship between the actuator rod 18 and said lever during the downward stroke. Thus, the lever and rod remain locked together to move as a single unit to perform the dispensing operation. The phantom representation of the knob 26 is its position prior to the dispensing of a particular dose; and the solid representation is its position after dispensing said dose.

Immediately after a particular dose has been dispensed the lever 48 is in the position shown in FIG. 4. Thereafter the downward force, indicated by arrow 66, is released. The compression spring 56 will then act upon the lever 48 to first tilt it into a position generally normal to the actuator rod 18, and then to move said lever in an upward direction relative to said rod. When the lever moves into engagement with the front upper wall section 62 of the slot it will become canted, and lock against the actuator rod 18, as illustrated in FIG. 2. Thereafter the lever 48 can be pushed downwardly to dispense an additional dose. This multiple dispensing of doses can continue until the content of the barrel 14 has been depleted.

In the multiple dispensing of dosages it is often desirable to precisely set the quantity of liquid to be dispensed. The structural arrangement of elements for permitting this function to be performed will now be explained.

Referring specifically to FIGS. 2 and 3, the main body 12 includes inner and outer housings 72 and 74 rotatable relative to each other through cooperating threaded connections 76 and 78, respectively. Rotation of these housings relative to each other will also cause relative axial movement between them. The actuator rod 18 passes through the passageway or opening in the inner housing 72, and has a laterally extending pin 80 directed through it, and slidably received within diametrically opposed inner vertical grooves 82 in said inner housing 72 (FIG. 2). A washer 84, or other stop element, rests on an inwardly directed shelf of the housing in which the vertical grooves 82 are provided, and the earlier-referred to compression spring 56 is supported on this washer. In other words, the compression spring is maintained in its compressed condition by being retained between the washer 84 and the bottom surface 58 of the finger-operated dispensing lever 48.

A compression spring 86, stiffer than the compression spring 56, is supported outwardly of the spring 56 and engages the lower surface 88 of the sleeve 70 to bias it in an upward direction. Diametrically opposed, generally annular buttons 90 extend through correspondingly shaped openings provided through sidewalls of the inner housing 72. These buttons extend into the interior compartment of the inner housing for engaging upwardly facing shoulder 92 of a lower annular flange section 94 of the sleeve 70 to thereby limit upward movement of the sleeve relative to the inner housing 72. Because of this arrangement the sleeve 70 will move axially as a unit with the inner housing 72 when the inner and outer housings are rotated relative to each other, unless and until a compressive load is applied to the top surface of the sleeve to cause it to overcome the relative stiff opposing compressive force of spring 86. Accordingly, the dispensing stroke DS (FIG. 2) can be varied by merely rotating the inner and outer housing 72 and 74 relative to each other to thereby change the distance between the upper surface 68 of the sleeve 70, and the bottom surface 58 of the finger-operated dispensing lever 48. This relative rotational motion can be achieved in an extremely simple manner by merely holding the outer housing 74 while rotating the actuator rod 18 through its connected knob 26. Rotation of the rod 18 will rotate the transversely extending pin 80 extending through it, and the pin 80, through its engagement with side surfaces of the inner vertical grooves 82 of the inner housing 72, will rotate said inner housing while the outer housing is being held. This relative rotation between the inner and outer housings will move the inner housing 72 and the sleeve 70 either upwardly or downwardly relative to the outer housing 74 to either shorten or lengthen the dispensing stroke DS. The desired position between the inner and outer housing is maintained by an O-ring 93 that imposes sufficient drag between the two housings to prevent their inadvertent rotation relative to each other. If desired, other drag-creating mechanisms can be employed.

As explained earlier, the compression spring 86 is made sufficiently stiff so that it will prevent the inadvertent compression of the sleeve 70 by the hand-operated lever 48 during the dispensing operation. This is extremely important since the inadvertent displacement of the sleeve 70 would increase the length of the dispensing stroke to cause an excessive quantity of fluid to be dispensed.

Referring to FIGS. 1-3, an indicating system is employed to set the unit 10 for dispensing the desired amount of fluid. Specifically, the outer housing 74 is provided with indicating indicia 96 cooperating with a complimentary indicator 98 (FIG. 3) on the barrel 14 to indicate the volume of liquid that will be dispensed when the inner and outer housings are in different axial positions relative to each other. Note that the barrel 14 is connected to move axially as a unit with the inner housing 72, and therefore can appropriately accommodate indicating indicia to cooperate with the indicia 96 on the outer housing 74 for indicating the relative axial position between said inner and outer housings. In this embodiment the outer housing 74 is made transparent so that the indicia on the barrel, once moved into the outer housing, will still be viewable.

In view of the above it can be seen that the dosage to be dispensed can be set by rotating the actuator rod 18 through its connected knob 26 to thereby rotate the inner housing 72 relative to the outer housing 74. This changes the length of the dispensing stroke DS, and the specific volume to be dispensed will be indicated by the micrometer calibrations 96 and 98.

As can be seen in FIGS. 2 and 3, the barrel 14 has an upper cup-shaped widened section 99 having an inturned annular rib 100 for engaging an annular recess 102 provided in the outer wall of the inner housing 72. Beneath this connection the wall of the inner housing tapers downwardly to form a conical section 104. A substantially cylindrical sleeve section 106 extends downwardly from the conical section, and closely conforms to the periphery of the actuator rod 18. More importantly the sleeve 106 has a lower surface 108 that overlies a top wall of the piston head 20 to aid in removing the piston head from the rod 18 when it is desired to separate, or remove the barrel 14 from the main body section 12. This is necessary since the interconnection provided between the rib 100 of the barrel and the annular recess 102 in the inner housing 72 will prevent manual removal of the barrel from the inner housing with an in-line, or straight pulling force. In fact, the connection is designed so that to easily separate the barrel from the main body 12 they must be bent relative to each other, in a manner similar to that employed to break a twig. In order that this can be accomplished without damaging either the actuator rod or piston head it is important to separate the piston head from the rod, and thereafter to retract the rod out of the barrel. This can be achieved by pulling the actuator rod 18 outwardly from its position shown in FIG. 3 to cause the lower surface 108 of the sleeve 106 to engage the upper surface of the piston head 20 and snap it off of the rod. Thereafter the barrel 14 can be snapped off of the main body 12 if replacement and or removal of said barrel is desired. For example, it is envisioned that the barrel 14 could be a prepackaged vial including the particular reagent or medicant to be dispensed, and therefore, when the vial is emptied it may be necessary to replace it with a full one. It is known to package a reagent or medicant in a vial including a piston head as part of its construction. The present device is contemplated for use with this type of vial by appropriately designing the end of the actuator rod to receive the piston head associated with the vial.

Referring specifically to FIGS. 2 and 3 the tip 16 is provided with an upper section including an outer surface that is frictionally received against the inner surface at the lower end of the barrel 14. An outwardly directed rib 110 is provided to engage the bottom surface of the barrel to properly position the tip within said barrel.

When the dispenser unit 10 is employed for precision, single dose dispensing operations (i.e. pipetting) it is common to suck the exact quantity of liquid to be dispensed only into the tip 16, and thereafter to dispense that quantity in a single dispensing operation. It is often necessary to dispense various reagents in a set of tests or experiments, and this necessitates the frequent replacement of the tip 16 to avoid contamination. The present invention provides an extremely simple and reliable mechanism for releasing, or separating the tip 16 from the barrel 14.

Figure 7:
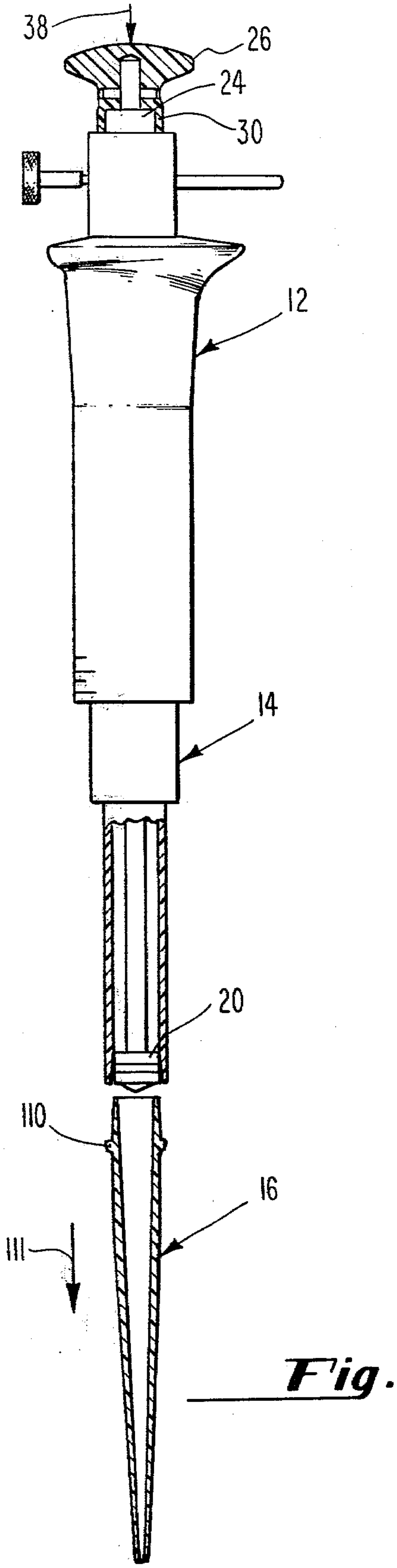
FIG. 7 is a elevational view of the dispenser unit with sections broken away to show details relating to the removal of the tip from the device.

Referring to FIG. 7, separation of the tip 16 from the barrel 14 is accomplished by pressing downwardly on the upper surface of the knob 26 connected to the actuator rod 18, as indicated by arrow 38 (FIGS. 2 and 7), to flex the annular skirt portion 30 of the knob outwardly over the annular hub 24 of the main body 12. As can be seen best in FIG. 2, the piston head 20 is very close to the upper end of the tip 16 when the lower surface 34 of the skirt 30 is in engagement with the upper surface 36 of the annular hub 24. Forcing the skirt 30 over the sidewall of the hub, as shown in FIG. 7, will force the piston head 20 against the upper end of the tip 16 and force the tip in an axial direction, as indicated by arrow 111, to separate it from the barrel.

Figure 5:
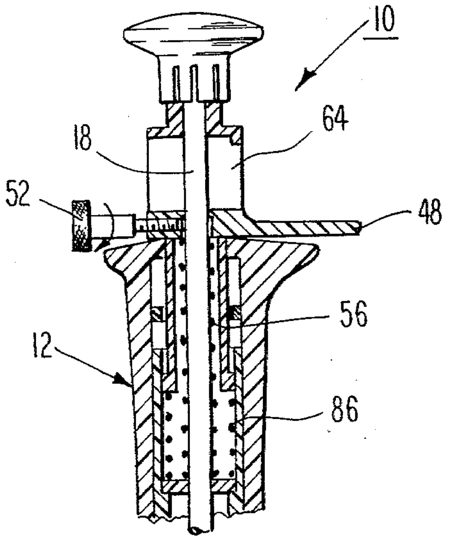
FIG. 5 is a fragmentary view of the top portion of the device, illustrating the manner in which it is converted from a multiple dose dispenser into a single dose dispenser.
Figure 6:
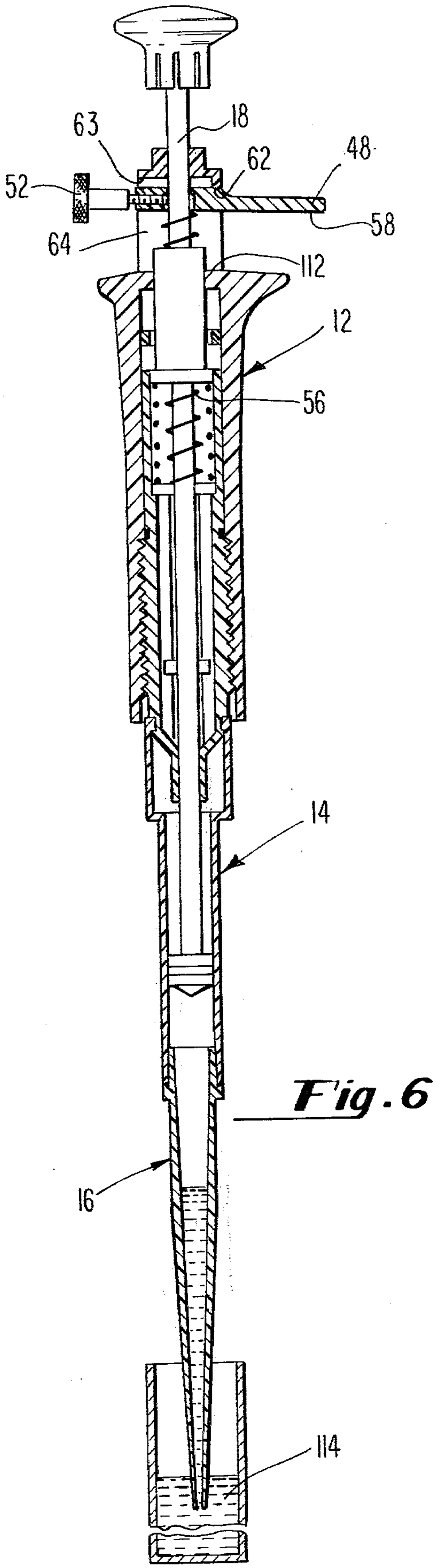
FIG. 6 is a sectional view showing the relationship of elements when the dispenser unit is ready for operation as a single dose dispensing device.

Referring specifically to FIGS. 5 and 6, the manner in which the dispenser unit 10 is converted from multiple dose dispensing to single dose dispensing will now be described. First, the finger-operated dispensing lever 48 is forced in a downward direction to override the stiff compression spring 86, and force the sleeve 70 downwardly to a position wherein its upper surface 68 is flush with the lower wall 112 of the main body 12 at the bottom of the slot 64 (FIG. 5). The lever is maintained substantially normal to the axis of the actuator rod 18 as it is forced downwardly so that it slides over the rod without moving it. In this position the set screw 52 is rotated to cause the end thereof to move into the offset section of passageway 50, and then into engagement with the rod 18 to lock the dispensing lever 48 to said actuator rod so that the lever and rod will move a single unit. Specifically, as the set screw 52 is moved into engagement with the actuating rod 18 it will cause the lever 48 to become canted, as shown in FIG. 6, as a result of providing the securing screw 52 in alignment with the lower offset section of the passageway 50. Canting of the lever will cause surfaces in the upper section of the passageway 50 that closely surround the actuator rod 18 to engage and lock against the actuator rod so that the lever and rod will move as a single unit in both axial directions. The force required to cant the lever into locking engagement with the rod is only a fraction of the force the would be required to lock the lever and rod together directly through the set screw itself, without relying on the canting of said lever relative to the actuator rod. After the lever 48 is locked to the actuator rod 18, the downward force on the lever is released to permit the lever and rod to move into the position shown in FIG. 6. In this position the set screw 52 maintains the lever canted relative to the actuator rod 18, and therefore the orientation of the front and rear upper slot wall sections 62 and 63 relative to each other is not relied upon to provide this canting function. The desired volume of liquid to be dispensed as a single dose is then drawn into the tip 16 by first pressing the operating lever 48 downwardly, but only until it engages the upper surface 68 of the sleeve 70; without compressing said sleeve (e.g. FIG. 4). The tip 16 is then placed in the fluid 114 that is to be dispensed, and the lever 48 is released to permit the liquid to be sucked into the tip as the lever 48 is moved to its uppermost position within the slot 64 by the compression spring 56. Note that the action of the set screw 52 will prevent the spring 56 from tilting the lever 48 into a position normal to the actuator rod 18. Therefore the lever 48 will remain canted and locked to the rod as it moves either upwardly or downwardly in the slot 64. Accordingly, in this mode of operation the actuator rod and lever will always move as a single unit.

To then dispense the volume of liquid that has been sucked into the tip, the lever 48 is first depressed until its bottom surface 58 engages the upper surface 68 of the sleeve 70. This stroke theoretically should remove all of the reagent sucked into the tip, since it was precisely this length of stroke that was employed to suck in the reagent. However, due to surface tension effects, it is common for a drop or two of the reagent to remain adhered to the lower end of the tip at the end of the initial dispensing stroke. The proper dispensing of these drops can be critical when dealing with the precise dispensing of extremely small dosages. To be certain that any residual drops are completely dispensed the lever 48, after the initial dispensing stroke, is firmly pressed to override the compressive force established through the stiff compression spring 86. This causes an incremental movement of the piston head 20 to thereby act as an air cylinder to force any residual drops from the tip. Note that moving the actuator rod 18 downwardly by forcing the sleeve 70 down will not cause the piston head 20 to engage and eject the tip 14 because the initial connection of the operating lever 48 to the actuator rod 18 was made with the sleeve 70 depressed, as shown in FIG. 5, and with the piston head 20 just out of engagement with the top of the tip 14, as shown in FIG. 2.

It should be apparent that the specific single dosage that is sucked into the tip and subsequently dispensed can be varied by changing the length of the dispensing stroke of the lever 48 in exactly the same manner as described above in connection with multiple dispensing of fluids from the barrel 14.

Figure 8:
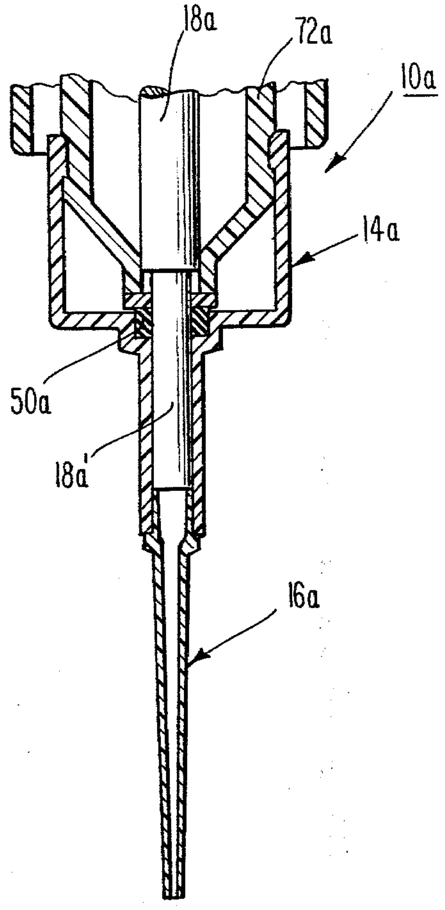
FIG. 8 is a bottom fragmentary view illustrating a modification of the dispenser unit.

Referring to FIG. 8, a modified lower portion of a dispenser unit **10*a* in accordance with this invention is shown. It should be understood that the other components of the dispenser unit 10*a* that are not shown in FIG. 8 can be identical to those shown in FIGS. 1–7. Specifically, the operation of the finger-engagable lever 48, the arrangement of inner and outer housings 72 and 74 to vary the length of the lever stroke DS, and the arrangement of an override sleeve 70 with the inner housing 72 can all be employed with the arrangement of the lower portion of the dispenser unit 10*a* shown in FIG. 8**.

Referring specifically to FIG. 8, elements similar to those described above in connection with the dispenser unit 10 will be referred to by the same numerals, but with a suffix "a" thereafter. In this device a barrel **14*a* is connected to an inner housing 72*a* in substantially the same manner described above in connection with FIGS. 1–7. Likewise, the barrel 14*a* frictionally receives a tip 16*a*in the same manner as described above. An actuator rod 18*a* differs from the actuator rod 18 disclosed in FIGS. 1–7 in that it can be employed to both suck in and dispense fluids without the use of a piston head. Specifically the actuator rod 18*a* is provided by a highly polished and machined metal part that is precision ground, and includes a lower, substantially cylindrical section 18*a*′ that closely conforms to inner surfaces of the lower section of barrel 14*a* in which the tip 16*a* is frictionally received. This cylindrical section 18*a*′ is in fluid-tight engagement with a sealing ring 50*a*, but can slide relative to said ring. This sealing arrangement permits liquid to be drawn into the tip 16*a* by the upward movement of the actuator rod 18*a*. Moreover, the bottom surface of the lower rod section 18*a*′ can be employed to eject the tip 16*a*, in the same manner described above in connection with the dispenser unit 10** (FIG. 7).

In the FIG. 8 embodiment there is no need to remove a piston head, similar to piston head 20, from the actuator rod **18*a* prior to removing the barrel 14*a* from the inner housing 72*a*. Specifically, the actuator rod 18*a* need only be retracted until its lower section 18*a*′ is pulled into the inner housing 72*a*. Thereafter the barrel 18*a* can be separated from the inner housing 72*a* by a motion similar to the breaking of a twig, as was described above in connection with the dispenser unit 10**.

Although the present invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. A dispenser unit that is adjustable for dispensing a fluid in either single or multiple doses; said unit comprising:

- an elongate actuator rod axially moveable in one direction to dispense the fluid;
- a hand-engagable dispensing lever provided with a passageway through which said actuator rod extends, said actuator rod and lever being axially moveable relative to each other when said lever is disposed generally normal to the axis of said actuator rod, said passageway being provided with a surface that closely surrounds the actuator rod and locks against said rod when said lever is canted out of said generally normal position to thereafter permit the lever to move the actuator rod in said one axial direction to dispense the fluid;
- spring means for applying a biasing force to said lever in a direction opposed to said one axial direction but permitting said lever to be canted and moved with said rod in said one axial direction by the application of a dispensing force to said lever that opposes the biasing force of said spring means, said spring means being adapted to move said lever out of its canted orientation with said actuator rod, and then relative to said actuator rod when the dispensing force is removed from said lever at the end of a dispensing stroke; and
- securing means moveable to cause the lever and actuator rod to lock together so that said lever and rod will move as a single unit in either axial direction.

2. The dispenser unit of claim 1 wherein said securing means includes a actuator rod-engaging member moveable through a wall defining the passageway in said lever for engaging said actuator rod and causing said actuator rod and lever to lock together.

3. The dispenser unit of claim 2 wherein the passageway through the lever includes a lower offset section spaced further from the actuator rod than an upper section of said passageway, said securing means passing through the lower offset section of the passageway and into engagement with the actuator rod for canting the lever into locking engagement with said actuator rod.

4. The dispenser unit of claim 1 wherein said actuator rod extends axially through a body section, said body section including an elongate slot through which a hand-engagable portion of said lever extends; said elongate slot being interrupted by upper and lower surfaces axially spaced from each other; said spring means normally biasing said lever against said upper surface, and said lower surface being engagable by said lever to limit the dispensing stroke of said lever and actuator rod.

5. The dispenser unit of claim 4, wherein the upper surface has a front section that is lower than a rear section thereof, whereby said spring means biases said lever against said upper surface in canted relationship to the actuator rod to lock said actuator rod and lever together at the top of the dispensing stroke.

6. The dispenser unit of claim 4, wherein the body section includes inner and outer housing members moveable axially relative to each other; the upper surface interrupting said slot being a surface moveable with one of said housing members and the lower surface interrupting said slot being a surface moveable with the other of said housing members, whereby axial movement of said housing members relative to each other changes the axial length of the slot to thereby vary the dispensing stroke of the lever and actuator rod.

7. The dispenser unit of claim 6 including indicating indicia on surfaces that are axially moveable with the inner and outer housings for providing an indication of the volume of fluid to be dispensed.

8. The dispenser unit of claim 6 wherein the lower surface interrupting said slot is an upper surface of a downwardly compressible sleeve that is axially moveable as a unit with the inner housing, said sleeve being spring loaded in a direction opposing downward compression thereof by a spring means that is stiffer than the spring means employed to bias the operating lever against the upper surface interrupting said slot.

9. The dispenser unit of claim 8 wherein surfaces moveable with said inner and outer housings include cooperating indicating indicia to provide an indication of the volume of fluid to be dispensed by movement of the operating lever from its position adjacent the upper surface that interrupts the slot, into engagement with the upper surface of the compressible sleeve, prior to compression of said sleeve.

10. A dispenser unit for the precision dispensing of a fluid dosage from a tip thereof; said unit comprising;

- a body section including a hub at its upper end, said hub including an upper wall and a sidewall extending downwardly from said upper wall;
- a barrel connected adjacent one end to the body section;
- said tip including an upper end frictionally engaging inner surfaces of said barrel at the end opposite said one end;
- an actuator rod extending axially through the body section and into the barrel; and
- a knob connected to the end of the actuator rod extending through the upper wall of the hub; said knob including a downwardly directed annular skirt having lower surfaces positioned to normally engage the hub adjacent the upper wall thereof; said skirt being flexible for movement over the sidewall of the hub when a downward force is applied to the knob to thereby move a lower end of the actuator rod, or a piston head connected to said actuator rod; into engagement with an upper surface of the tip to release the frictional engagement between the tip and the inner surfaces of said barrel.

11. The dispenser unit of claim 10 wherein a piston head is releasably connected to the actuator rod and can be released by an axial force applied to an upwardly directed surface of the piston head that extends laterally beyond the actuator rod; said body including a lower surface for engaging the upwardly directed surface of the piston head upon withdrawal of the actuator rod to thereby remove the piston head from said actuator rod.

12. A dispenser unit that is adjustable for dispensing a fluid in either single or multiple doses; said unit comprising:

- an elongate actuator rod axially moveable in one direction to dispense the fluid;
- a hand engagable dispensing lever provided with a passageway through which said actuator rod extends;
- securing means moveable in one direction into a first position to cause the lever and the actuator rod to lock together and move as a unit in both axial directions, said securing means being moveable in a second direction into a second position to permit movement of the lever relative to the rod in an axial direction opposed to said one axial direction in which the fluid is dispensed; and
- the passageway provided in the dispensing lever including a surface for locking against the rod, and moving the rod when the lever is moved in a direction to cause the actuator rod to move in said one axial direction to dispense the fluid and with the securing means in its second position.

13. The dispenser unit of claim 12 wherein the actuator rod and lever are axially moveable relative to each other when the axis of the passageway is disposed generally parallel to the axis of the actuator rod, and the surface of the passageway engages the rod for moving it when the passageway is canted so that the axis thereof is out of the generally parallel relationship with the rod, further including spring means for applying a biasing force to said lever in a direction opposed said one axial direction in which fluid is dispensed but permitting movement of the lever to cant the passageway and cause the rod to move with the lever in said one axial direction by the application of a dispensing force to said lever that opposes the biasing force of said spring means, said spring means being adapted to move the lever into a position in which the axis of the passageway is generally parallel to the actuator rod, and then relative to the actuator rod when the dispensing force is removed from the lever at the end of a dispensing stroke.

14. The dispenser unit of claim 12 wherein said securing means includes an actuator rod-engaging member moveable through a wall defining the passageway in said lever for engaging said actuator rod.

15. The dispenser unit of claim 14 wherein the passageway through the lever has one end section thereof spaced further from the actuator rod than the other end section, said securing means, when moved in said one direction, being moveable into said one end section for engaging the actuator rod and canting the lever into locking engagement with the rod.

16. The dispenser unit of claim 12 wherein said actuator rods extend axially through a body section, said body section including an elongate slot being interrupted by upper and lower surfaces axially spaced from each other to limit the dispensing stroke of said lever and actuator rod.

17. The dispenser unit of claim 16 wherein the body section includes inner and outer housing members moveable axially relative to each other; the upper surface interrupting said slot being a surface moveable with one of said housing members and the lower surface interrupting said slot being a surface moveable with the other of said housing members, whereby axial movement of said housing members relative to each other changes the axial length of the slot to thereby vary the dispensing stroke of the lever and the actuator rod.

18. The dispenser unit of claim 17 including indicating indicia on surfaces that are axially moveable with the inner and outer housings for providing an indication of the volume of fluid to be dispensed.

19. A dispenser unit for the precision dispensing of a fluid dosage; said unit comprising:

an elongate body section having an opening through an end wall thereof;

an elongate actuator rod extending axially through the body section and through the opening in the end wall;

a knob connected to the end of the actuator rod extending through the end wall of the body section and engageable for moving the actuator rod axially into the body section to a predetermined position by the application of a first downward axial force to the knob; and means associated with the knob for permitting additional axial movement into the body section upon the application of a second downward axial force to the knob greater than said first force;

a barrel connected adjacent the end of the body section opposite the end wall through which extends the end of the rod containing the knob;

a tip including an upper end frictionally engaging inner surfaces of said barrel;

said actuator rod extending axially through the body section and into the barrel whereby application of the second and higher downward axial force to the knob will move a lower end of the actuator rod, or a piston head connected to said actuator rod, into engagement with an upper surface of the tip to release the frictional engagement between the tip and the inner surfaces of said barrel.

20. A dispenser unit for the precision dispensing of a fluid; said unit comprising:

an elongate actuator rod axially moveable in one direction to dispense the fluid;

a hand-engageable dispensing lever extending laterally of the actuator rod and including a passageway through which said actuator rod extends, said actuator rod and lever being axially moveable relative to each other when the axis of the passageway is disposed generally parallel to the axis of the actuator rod, said passageway being provided with a surface that engages the rod for moving it when the passageway is canted so that the axis thereof is out of said generally parallel relationship with the rod, said lever being engageable by hand for maintaining the lever in a position to cant the axis of said passageway for engaging the surface of the passageway with the actuator rod while moving said rod in said one axial direction to dispense the fluid;

a body section through which the actuator rod axially extends, said body section including an elongate slot through which the hand-engageable section of the dispensing lever extends, said elongate slot being interrupted by upper and lower surfaces axially spaced from each other to define the length of the dispensing stroke of said lever; and an adjustment means for changing the axial spacing between the upper and lower surfaces interrupting the slot to thereby change the length of the dispensing stroke of said lever.

21. The dispenser unit of claim 20 including spring means for biasing said lever against the upper surface interrupting said slot and permitting said lever to move into a position for canting the passageway so that the lever can move said rod in said one axial direction toward the lower surface interrupting said slot.

22. The dispenser unit of claim 20 wherein said adjustment means includes inner and outer housing members of the body section that are moveable axially relative to each other; the upper surface interrupting said slot being a surface moveable with one of said housing members and the lower surface interrupting said slot being a surface moveable with the other of said housing members, whereby axial movement of said housing members relative to each other changes the axial spacing between the upper and lower surfaces, and thereby varies the dispensing stroke of the lever.

23. The dispenser unit of claim 22 including indicating indicia associated with surfaces moveable with the inner and outer housings for providing an indication of the volume of fluid that is to be dispensed.

24. The dispenser unit of claim 22 wherein said inner and outer housings include cooperating threads, whereby rotational movement of the inner and outer housings relative to each other causes the axial movement between said housings.

25. The dispenser unit of claim 22 including a barrel connected to the inner housing and adapted to contain a fluid therein, said actuator rod including a piston head releasably connected thereto at its lower end and closely conforming to inner surfaces of the barrel, said piston head having an upwardly directed surface extending laterally beyond the actuator rod, said inner housing including a lower surface laterally aligned with said upwardly directed surface of the piston head, a knob means connected to the outer end of the actuator rod remote from the piston head for engagement by the user of the unit to pull the piston head outwardly relative to the lower surface of the inner housing to force the lower surface of the said inner housing into engagement with the upwardly directed surface of the piston head to apply an axial force to said piston head for releasing it from the actuator rod.

* * * * *